(12) United States Patent
Hershkovitz et al.

(10) Patent No.: US 11,513,939 B2
(45) Date of Patent: Nov. 29, 2022

(54) MULTI-CORE I/O TRACE ANALYSIS

(71) Applicant: EMC IP Holding Company LLC, Hopkinton, MA (US)

(72) Inventors: Gabriel Hershkovitz, Newton, MA (US); Jerome J. Cartmell, Natick, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 355 days.

(21) Appl. No.: 16/530,134

(22) Filed: Aug. 2, 2019

(65) Prior Publication Data

US 2021/0034499 A1 Feb. 4, 2021

(51) Int. Cl.
| | |
|---|---|
| *G06F 11/00* | (2006.01) |
| *G06F 11/34* | (2006.01) |
| *G06F 13/40* | (2006.01) |
| *G06F 8/41* | (2018.01) |
| *G06F 11/30* | (2006.01) |
| *G06F 13/16* | (2006.01) |

(52) U.S. Cl.
CPC ............ *G06F 11/3495* (2013.01); *G06F 8/43* (2013.01); *G06F 11/3034* (2013.01); *G06F 13/1668* (2013.01); *G06F 13/4022* (2013.01)

(58) Field of Classification Search
CPC ............ G06F 11/3034; G06F 11/3409; G06F 11/3466; G06F 11/348; G06F 11/3495
See application file for complete search history.

(56) References Cited

U.S. PATENT DOCUMENTS

| | | | | |
|---|---|---|---|---|
| 5,642,478 A | * | 6/1997 | Chen | G06F 11/3495 714/25 |
| 5,680,592 A | * | 10/1997 | Priem | G06F 13/105 703/27 |
| 6,769,054 B1 | * | 7/2004 | Sahin | G06F 11/3466 711/162 |
| 6,912,673 B1 | * | 6/2005 | Wyland | G06F 11/364 714/43 |
| 7,797,585 B1 | * | 9/2010 | Sahin | G06F 11/3409 714/45 |
| 9,875,167 B1 | * | 1/2018 | Norrie | G06F 11/302 |
| 10,698,613 B1 | | 6/2020 | Wigmore et al. | |
| 10,698,844 B1 | | 6/2020 | Wigmore et al. | |

(Continued)

*Primary Examiner* — Joshua P Lottich
(74) *Attorney, Agent, or Firm* — Muirhead and Saturnelli, LLC

(57) ABSTRACT

Improved mechanisms and techniques for recording and aggregating trace information from multiple computing modules of a storage system may be provided. On a storage system having multiple computing modules, where each computing module has multiple processing cores, processing cores may record trace information for I/O operations in dedicated local memory—i.e., memory in the same computing module as the processing core that is dedicated to the computing module. One of the processing cores may be configured to aggregate trace information from across multiple computing modules into its dedicated local memory by accessing trace information from the dedicated local memories of the other computing modules in addition to its own. The aggregated information in one dedicated local memory then may be analyzed for functionality and/or performance and additional action taken based on the analysis.

22 Claims, 8 Drawing Sheets

(56) References Cited

U.S. PATENT DOCUMENTS

| | | | |
|---|---|---|---|
| 10,740,259 B1 | 8/2020 | Wigmore et al. | |
| 11,151,063 B2 | 10/2021 | Wigmore et al. | |
| 11,157,184 B2 | 10/2021 | Chanler et al. | |
| 2010/0332909 A1* | 12/2010 | Larson | G06F 11/3495 714/40 |
| 2012/0324290 A1* | 12/2012 | Chen | G06F 11/3476 714/34 |
| 2015/0127992 A1* | 5/2015 | Sankar | G06F 11/3003 714/45 |
| 2015/0127994 A1* | 5/2015 | Sankar | G06F 11/3636 714/45 |
| 2015/0269054 A1* | 9/2015 | Kothamasu | G06F 11/3476 714/45 |
| 2017/0346675 A1* | 11/2017 | Prokofiev | H04W 24/08 |
| 2018/0225446 A1* | 8/2018 | Liu | G06F 11/3636 |
| 2018/0357074 A1* | 12/2018 | Sharoni | H04N 5/77 |
| 2020/0210195 A1* | 7/2020 | Lampert | G06F 9/3838 |
| 2020/0210320 A1* | 7/2020 | Strong | G06F 11/3636 |
| 2020/0333964 A1 | 10/2020 | Wigmore et al. | |
| 2021/0034499 A1 | 2/2021 | Hershkovitz et al. | |
| 2021/0157660 A1 | 5/2021 | Hershkovitz et al. | |
| 2021/0342078 A1 | 11/2021 | Krasner et al. | |

* cited by examiner

500

| Time | Trace ID | Description | Action | Computing Module ID | Core ID | Other Info |
|---|---|---|---|---|---|---|
| 3237 | 32 | Read Data X | Receive | A | 1 | |
| 3244 | 61 | Lock cache slot | Send | A | 1 | |
| 3266 | 55 | ACK cache locked | Receive | A | 1 | |
| 3268 | 22 | Retrieve Data X from disk | Send | A | 1 | |
| 3294 | 26 | ACK retrieve data from desk | Receive | A | 1 | |

520

| Time | Trace ID | Description | Action | Computing Module ID | Core ID | Other Info |
|---|---|---|---|---|---|---|
| 3272 | 22 | Retrieve Data X from disk | Receive | A | 3 | |
| ... | ... | ... | ... | ... | ... | |
| 3292 | 26 | ACK retrieve data from desk | Send | A | 3 | |

540

| Time | Trace ID | Description | Action | Computing Module ID | Core ID | Other Info |
|---|---|---|---|---|---|---|
| 3146 | 61 | Lock cache slot | Receive | B | 2 | |
| 3156 | 67 | Lock cache slot | Execute | B | 2 | |
| 3164 | 55 | ACK cache locked | Send | B | 2 | |

| | Time | Trace ID | Description | Action | Computing Module ID | Core ID | Pointer |
|---|---|---|---|---|---|---|---|
| 602a | 3237 | 32 | Read Data X | Receive | A | 1 | |
| 602b | 3244 | 61 | Lock cache slot | Send | A | 1 | |
| 602c | 3266 | 55 | ACK cache locked | Receive | A | 1 | |
| 602d | 3268 | 22 | Retrieve Data X from disk | Send | A | 1 | |
| 602e | 3272 | 22 | Retrieve Data X from disk | Receive | A | 3 | |
| 602f | ... | ... | ... | ... | ... | ... | |
| 602g | 3292 | 26 | ACK retrieve data from desk | Send | A | 3 | |
| 602h | 3294 | 26 | ACK retrieve data from desk | Receive | A | 1 | |

| Time | Trace ID | Description | Action | Computing Module ID | Core ID | Pointer |
|---|---|---|---|---|---|---|
| 3146 | 61 | Lock cache slot | Receive | B | 2 | |
| 3156 | 67 | Lock cache slot | Execute | B | 2 | |
| 3164 | 55 | ACK cache locked | Send | B | 1 | |
| 3237 | 32 | Read Data X | Receive | A | 1 | |
| 3244 | 61 | Lock cache slot | Send | A | 1 | |
| 3266 | 55 | ACK cache locked | Receive | A | 1 | |
| 3268 | 22 | Retrieve Data X from disk | Send | A | 1 | |
| 3272 | 22 | Retrieve Data X from disk | Receive | A | 3 | |
| ... | ... | ... | ... | ... | ... | |
| 3292 | 26 | ACK retrieve data from desk | Send | A | 3 | |
| 3294 | 26 | ACK retrieve data from desk | Receive | A | 1 | |

FIG. 7A

| | Time | Trace ID | Description | Action | Computing Module ID | Core ID | Pointer |
|---|---|---|---|---|---|---|---|
| 702d' | 3137 | 32 | Read Data X | Receive | A | 1 | |
| 702e' | 3144 | 61 | Lock cache slot | Send | A | 1 | |
| 702a | 3146 | 61 | Lock cache slot | Receive | B | 2 | |
| 702b | 3156 | 67 | Lock cache slot | Execute | B | 2 | |
| 702c | 3164 | 55 | ACK cache locked | Send | B | 1 | |
| 702f | 3166 | 55 | ACK cache locked | Receive | A | 1 | |
| 702g' | 3168 | 22 | Retrieve Data X from disk | Send | A | 1 | |
| 702h' | 3172 | 22 | Retrieve Data X from disk | Receive | A | 3 | |
| | ... | ... | ... | ... | ... | ... | |
| 702j' | 3192 | 26 | ACK retrieve data from desk | Send | A | 3 | |
| 702k' | 3194 | 26 | ACK retrieve data from desk | Receive | A | 1 | |

FIG. 7B

MULTI-CORE I/O TRACE ANALYSIS

BACKGROUND

Technical Field

This application generally relates to data storage systems, and more particularly to I/O trace analysis on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

In some embodiments, a method is performed on a storage system including a plurality of computing modules, each of the plurality of computing modules including a plurality of central processing units and a local memory dedicated to the computing module, and each of the plurality of computing modules connected to the other of the plurality of computing modules by an internal switching fabric of the storage system, wherein, within each computing module, the plurality of central processing units are groups into a plurality of processing cores. The method includes, within two or more of the plurality of computing modules, for an I/O operation performed on the storage system, recording trace information in the respective memory of the computing module for one or more sub-operations of the I/O operation performed by one or more of the plurality of cores of the computing module. The method further includes a first of the plurality of processing cores on a first of the plurality of computing modules accessing first information corresponding to the recorded trace information in the respective local memory of at least a first of the two or more computing modules, and the first processing core organizing the first information into a form facilitating analysis of the first information to determine functional and/or performance characteristics corresponding to the I/O operation.

The recording of the trace information may include recording the trace information in at least a first data structure including a plurality of entries, each entry representing a respective I/O sub-operation and specifying a time at which the respective I/O operation was performed according to clock utilized by the respective core that recorded the entry. The accessed first information may be accessed, for each of the at least first computing module, from a second data structure of the at least first computing module derived from the at least first data structure, the second data structure including a plurality of entries, each entry in the second data structure corresponding to a respective entry in the at least first data structure and specifying the time specified in the corresponding entry in the at least first data structure. Organizing the first information may include sorting the first information according to the times specified in the entries of the second data structure.

For each of the at least first computing module, each of the plurality of entries in the second data structure may include a pointer to a memory address of the corresponding entry in the at least first data structure, and includes less information than an amount of information recorded in the corresponding entry.

The method may further include receiving a request for more information associated with the one or more sub-operations than specified by the first information, and determining the more information by accessing one or more of the respective memory addresses pointed-to by one or more of the plurality of entries of the second data structure.

The first information may be stored in a third data structure in the local memory of the first computing module, the third data structure derived at least in part from a respective second data structure of the at least second computing module, and the third data structure including a plurality of entries, each entry corresponding to a respective entry of the respective second data structure and including the specified time and the pointer to the memory address included in the respective entry.

Organizing the first information may include determining a pair of entries of the third data structure that correspond to first sub-operation of the I/O operation, a first entry of the pair representing a sending of first sub-operation from a sending processing core of one of the plurality of computing units and a second entry of the pair representing a receiving of the first sub-operation at a receiving processing core of the plurality of processing cores, determining that a time specified by the second entry is less than a time specified by the first entry by a first amount, and modifying a respective time specified by one or more entries in the third data structure based on first amount.

A plurality of trace instructions may be included in software code executing on the storage system, each execution of one of the plurality of trace instructions resulting in a recording of a piece of the recorded information. The method may further include, after compilation of the software code, modifying what pieces of information are recorded.

In some embodiments, a data storage system includes one or more processors and a memory including code stored thereon that, when executed, performs the above-described method.

In some embodiments, one or more computer-readable media, for example, non-transitory computer-readable media, are provided having software stored thereon, where the software includes executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 5 is a block diagram illustrating examples of trace buffers, according to embodiments of the invention;

FIG. 6 is a block diagram illustrating an example of a computing module trace table, according to embodiments of the invention;

FIG. 7A is a block diagram illustrating an example of master trace table, according to embodiments of the invention; and FIG. 7B is a block diagram illustrating a modified master trace table, according to embodiments of the invention.

DETAILED DESCRIPTION OF EMBODIMENTS

Figure 1:
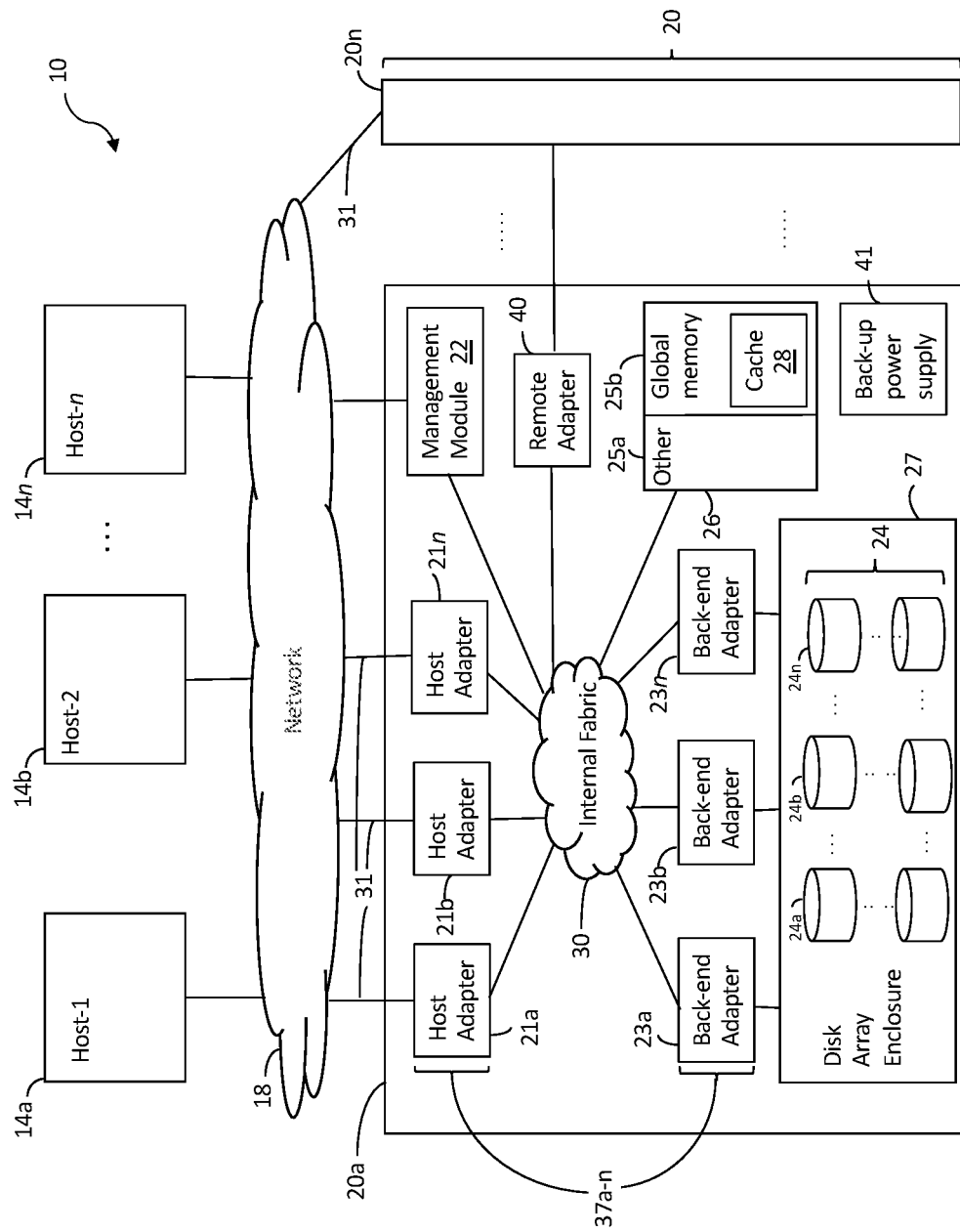
FIG. 1 is a block diagram illustrating an example of a data storage network, according to embodiments of the invention.

A storage system may have a plurality of physically discrete computing modules (hereinafter "computing modules") interconnected by an internal switching fabric of the storage system. For example, a computing module may be a director board of a PowerMax system made available from Dell EMC. Each computing module may have its own dedicated local memory and a global memory segment that is a portion of a distributed global memory shared by multiple (e.g., all) computing modules. Each computing module also may include one or more central processing units (CPUs), and, within each computing module, groups of two or more CPUs may be grouped into processing units referred to herein as processing cores. Each of these processing cores may be configured (e.g., hardwired, hardcoded or programmed) as a functional component of a storage system, for example, a front-end adapter (FA) or back-end adapter (BE) as described in more detail herein, or as some other functional component, for example, a data services component (DS) responsible for one or more data services, e.g., memory management for I/O operations. In some embodiments, a processing core may be configured to serve as a different functional component for different I/O operations.

A single I/O request (i.e., a SCSI command) received at the storage system from a host system may be collectively executed by multiple computing processing cores of the storage system. For example, a single I/O operation may result in several (e.g. tens or even more) sub-operations being performed on the storage system, and each of these sub-operations may be performed by a different processing core. Further, two or more of the multiple processing cores executing sub-operations of an I/O operation may be part of the same computing module, and two or more of the multiple processing cores executing sub-operations of an I/O operation may be part of separate computing modules.

It may be desirable to analyze the functionality (e.g., who is doing what and when) and/or performance (e.g., how well are they doing it) of a storage system or sub-components thereof. To this end, during execution of an I/O operation, various information may be recorded. For example, trace instructions may be written into the source code of the storage system. When executed, these trace instructions may store various information corresponding to the execution of a sub-operation and/or communications involving such sub-operations. This recorded information then may be analyzed to measure performance and/or determine functionality.

To perform such analysis, it may be necessary to use a centralized repository of the recorded trace information. If multiple processing cores across multiple computing modules are being used to execute I/O instructions, it may be desirable to record information at fine levels of temporal granularity (e.g., on the order of micro-seconds or even less) and/or physical granularity, e.g., at the level of processing cores. That is, it may be desirable to determine what is happening and when on each processing core throughout the execution of an I/O operation or a portion (e.g., one or more sub-operations) thereof. For better temporal accuracy in recording trace information for a processing core, it may be desirable to record the trace locally proximate (i.e., with high locality) to the processing core, e.g., in memory that is in the same computing module as the processing core. Further, as sub-operations of an I/O operation may be performed across multiple different computing modules, for a more thorough global assessment of performance, it may be desirable to store all of the trace information in a globally accessible location. Thus, it may be desirable to record the trace information with high locality and aggregate the information in a location that is globally accessible.

One solution to produce aggregated trace information from multiple computing modules is to have processing cores store trace information in global memory. However, global memory is not managed or controlled locally or dedicated to any one computing module. Thus, there is no guarantee that the instruction to store the trace information in global memory would result in the trace information being stored on a segment of global memory that is local to (i.e., on a same computing module as) the processing core that executes the trace instruction and posts the trace information to global memory. As a result, storing the trace information may result in storing trace information within a global memory segment on another computing module, which would require one or more communications being exchanged over the internal fabric of the storage system, costing time and system resources. Further, because global memory is shared among computing modules, multiple computing modules are contending for the same, centrally managed memory space, which may result in centralized locking of global memory portions resulting in further delays. Lastly, using global memory is more computationally expensive than using dedicated local memory because of the system resources involved in centralized management of the global memory.

Another potential solution to produce aggregated trace information from multiple computing modules is to have each processing core initially record trace information in the dedicated local memory of the computing module on which the processing core resides, and then copy needed trace information (e.g., in bulk) from each of the dedicated local memories of the computing modules to global memory. While this would save the computation cost of individually recording trace events to global memory, the copying to global memory would still involve the aforementioned shortcomings of global memory use.

What may be desirable is the ability to record and aggregate trace information from multiple computing modules of a storage system in a more computationally cost effective manner than known solutions.

Described herein are improved mechanisms and techniques for record and aggregating trace information from multiple computing modules of a storage system.

In some embodiments, on a storage system having multiple computing modules, where each computing module has multiple processing cores, processing cores record trace information for I/O operations in dedicated local memory—i.e., memory in the same computing module as the processing core that is dedicated to the computing module. One of the processing cores may be configured to aggregate trace information from across multiple computing modules into its dedicated local memory (i.e., the dedicated local memory of its computing module) by accessing trace information from the dedicated local memories of the other computing modules in addition to its own. The aggregated information in one dedicated local memory may be analyzed for functionality and/or performance and additional action taken based on the analysis, for example, as described in more detail elsewhere herein.

In some embodiments of the invention, one or more (e.g., all) of the processing cores of the computing modules may be configured to be able to access trace information in dedicated local memories of the other computing modules of the storage system, and different processing cores of different computing modules may be instructed at different times to access such trace information from dedicated local memories of other computing modules to implement embodiments of the invention.

While accessing information from dedicated local memories of other computing modules incurs the cost of communicating across the internal fabric of the storage system, it still may be computationally cheaper than using global memory. Further, it may be the case that there is no interest in analyzing the trace information of one or more computing modules in whatever analysis is performed, such that at least some communications across the internal fabric are avoided altogether. For example, a user may decide to analysis trace information only for a select few functional components (e.g. FAs and or BEs) implemented on processing cores within one or more first computing modules, but not to analysis trace information for one or more functional components implemented on processing cores within one or more second computing modules; in which case it is not necessary to access the trace information stored in the dedicated local memories of the one or more second computing modules.

The storage system (e.g., the processing cores of the storage system) may be configured (e.g., with software) to record any of a variety of trace information, including a time at which the trace information was recorded (i.e., the time at which the trace event (i.e., trace instruction) was executed). Each trace information record (e.g., entry of a data structure) may include any information that may be desirable to use in performance and/or functional analysis, and may include at least enough information to be able to uniquely identify the record and/or identify two records corresponding to a same sub-operation of an I/O operation. For example, a trace information record (also referred to herein as a "trace record") may include a unique identifier of an instance of a sub-operation and a time of execution of the sub-operation by the processing core. Each trace record also may include any of: an action associated with the processing core for the sub-operation (e.g., send, receive, execute); a functional component (e.g., FA, BE, DS) ID, a processing core ID, a host ID, a host port ID, one or more logical storage unit (LSU) IDs (e.g., storage group ID, LUN, thin device ID), a LSU location (e.g., logical track), a physical storage device ID, physical location (e.g., physical track) within physical storage device ID, cache slot ID, other metadata, a data payload, other information, or any suitable combination of the foregoing. What items of information to include in a trace record may be determined in consideration of a desired balance between the comprehensiveness of the trace information and memory consumption.

In some embodiments, each processing core of a computing module may have its own allotted portion of the dedicated local memory of its computing module in which to store trace information. For example, each processing core may have an allotted portion of dedicated local memory in which to implement a trace buffer including a plurality of trace records including trace information. Information associated with a trace record of a trace buffer of each processing core of a computing module may be aggregated into a single aggregated data structure of a computing module referred to herein as a computing module trace table or module trace table, for example, by one of the processing cores of the computing module. Each entry of the module trace table may correspond to an entry of a trace buffer of one of the processing cores.

In some embodiments, each record (i.e., entry) of a module trace table may include less information than the information included in the corresponding record in a trace buffer, and may include a pointer to the memory address of the corresponding entry. For example, in some embodiments, each module trace table record includes only: a minimum amount of information to uniquely identify the record from other module trace table entries, and to identify a specific sub-operation; a time the sub-operation executed; and a memory location of the corresponding record of the trace buffer. In some embodiments, the information included in each module trace table entry may be based on information provided by a user or other entity, which may be used to filter information from trace buffer records to populate module trace table records.

In some embodiments, the records of the module trace table may be sorted (e.g., by a processing core of the computing module), for example, based on the time value of the record indicating the time at which the represented sub-operation was executed.

In some embodiments, a processing core of one of the computing modules may aggregate records of multiple module trace tables into a single master trace table on the computing module of the processing core. The records of the master trace table may be sorted, for example, based on the time value of the record indicating the time at which the represented sub-operation was executed.

In some embodiments, the master trace table records may be analyzed to determine whether any two records constitute a pair of records for a same sub-operation, e.g., a first record of the pair representing a sending of first sub-operation from a sending processing core of one of the plurality of computing units and a second record of the pair representing a receiving of the first sub-operation at a receiving processing core of the plurality of processing cores. If a pair is determined, it may be determined whether the time specified by the record representing the receiving of the sub-operation is less than the time specified by the record representing the sending of the sub-operation, and if so, by how much time. Such a determination would indicate the clocks of the corresponding computing modules are skewed, even though a universal clock (e.g., in accordance with a network time protocol (NTP)) may have been employed. In response to this determination, any entries in the master record for the computing module (or at least the processing core) of the record representing the sending of the sub-operation, which indicate a time prior to such record (i.e., listed earlier in the master trace table if already sorted) may be decremented by at least an amount of the skew. Alternatively in response to this determination, any entries in the master record for the computing module (or at least the processing core) of the record representing the receiving of the sub-operation, which indicate a time after such record (i.e., listed later in the master trace table if already sorted) may be incremented by at least an amount of the skew. However, decrementing the records of the other computing module (or processing core thereof) as described above may be preferred to avoid having to adjust the entries corresponding to the computing module (or processing core thereof) of the receiving record again if additional future records are analyzed with respect to such records.

The records of the master trace table may be analyzed (e.g., manually on a GUI by a human) or automatically (e.g., in accordance with predefined logic) to determine if it is desirable to further investigate any particular one or more sub-operations in greater detail, for example, if the analysis reveals a potential performance issue. If it is so desirable, a programmable or user-specifiable amount of information from one or more records of one or more trace buffers on one or more computing modules may be accessed. For example, a timeframe and/or one or more other filters specifying any information recorded in trace buffers may be specified (e.g., by a user) and the time values and address pointers in the master trace table records may be used to identify the memory address of, and retrieve and filter information from, the trace buffer records in dedicated local memory of one or more computing modules. The filtered information may be further analyzed and further iterations of specifying, retrieving, filtering and analyzing trace information performed.

In some embodiments of the invention, trace instructions may be programmed into software that runs on the storage system, such trace instructions specifying when (by their logical position in the code) to record trace information and what information to record. In some cases, a user (e.g., storage administrator) may desire to include additional information to be recorded for one or more trace instructions, but realized this desire after the software has already been compiled. In some embodiments, the software may be configured to allow modification (or at least addition) of trace information to be recorded after compile time. For example, the software may be configured to call out to a predefined file or other software construct to determine what information to record. The software may be further configured to provide a user interface (e.g., GUI or command line interface) the enables a user to modify the information.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14*a-n*; network 18; one or more storage systems 20*a-n*; other components; or any suitable combination of the foregoing. Storage systems 20*a-n*, connected to host systems 14*a-n* through network 18, may collectively constitute a distributed storage system 20. All of the host computers 14*a-n* and storage systems 20*a-n* may be located at the same physical site, or, alternatively, two or more host computers 14*a-n* and/or storage systems 20*a-n* may be located at different physical locations. Storage network 10 or portions thereof (e.g., one or more storage systems 20*a-n* in combination with network 18) may be any of a variety of types of storage networks, such as, for example, a storage area network (SAN), e.g., of a data center. Embodiments of the invention are described herein in reference to storage system 20*a*, but it should be appreciated that such embodiments may be implemented using other discrete storage systems (e.g., storage system 20*n*), alone or in combination with storage system 20*a*.

The N hosts 14*a-n* may access the storage system 20*a*, for example, in performing input/output (I/O) operations or data requests, through network 18. For example, each of hosts 14*a-n* may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMf); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14*a-n* and the storage systems 20*a-n* included in the storage network 10 may be connected to the network 18 by any one of a variety of connections as may be provided and supported in accordance with the type of network 18. The processors included in the host computer systems 14*a-n* may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14*a-n* may issue an I/O request to the storage system 20*a* to perform an I/O operation. For example, an application executing on one of the host computers 14*a-n* may perform a read or write operation resulting in one or more I/O requests being transmitted to the storage system 20*a*.

Each of the storage systems 20*a-n* may be manufactured by different vendors and interconnected (not shown). Additionally, the storage systems 20*a-n* also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14*a-n*, for example, to the storage systems 20*a*-20*n*. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of circuit boards (i.e., "boards"), as described in more detail elsewhere herein.

In at least one embodiment, write data received at the storage system from a host or other client may be initially written to cache 28 and marked as write pending. For example, cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
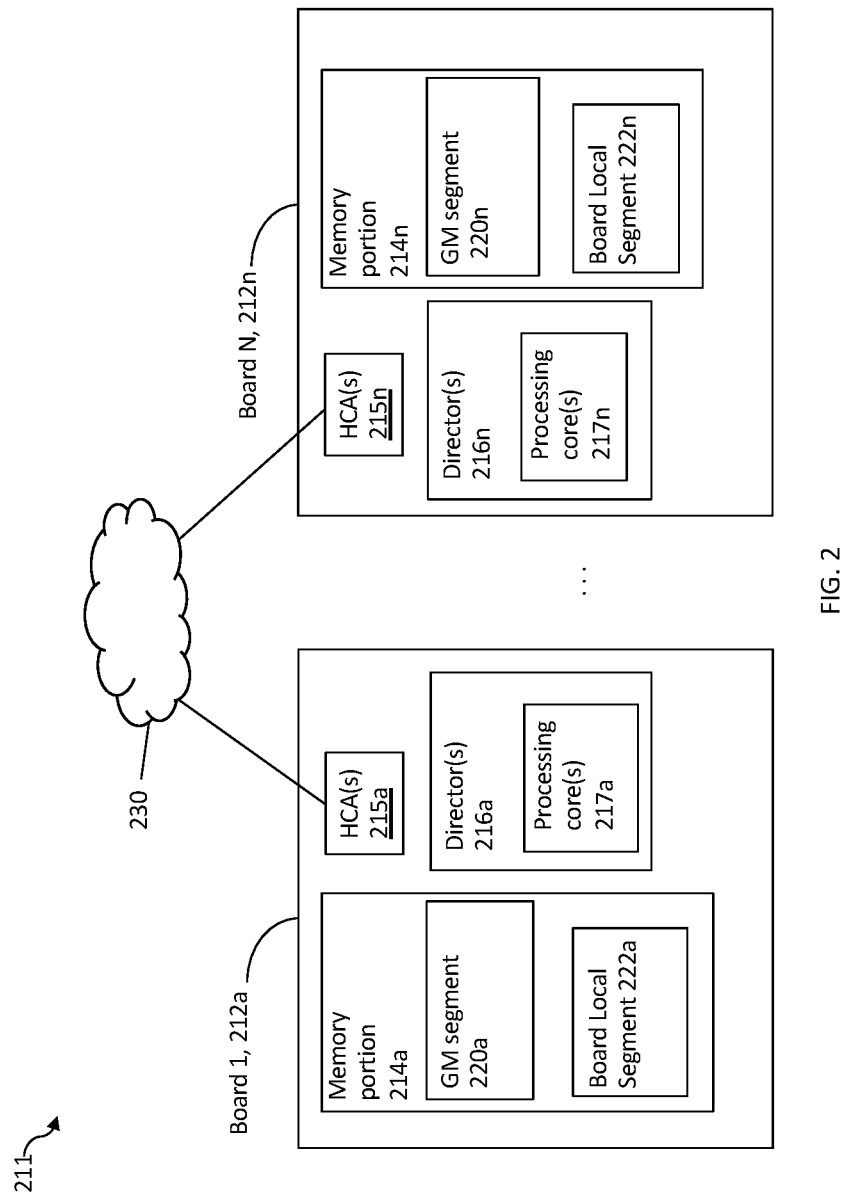
FIG. 2 is a block diagram illustrating an example of a storage system including multiple circuit boards, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

Host systems 14a-n may provide data and control (e.g., management and access control) information to storage systems 20a-n over a plurality of I/O paths defined between the host systems and storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly, but rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. Storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, board 212a includes memory portion 214a which is memory that is local to that particular board 212a. Data stored in memory portion 214a may be directly accessed by a CPU or core of a director 216a of board 212a. For example, memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of boards 212a-n may be further partitioned into different portions or segments for different uses. For example, each of the memory portions 214a-214n may respectively include GM segments 220a-n configured for collective use as segments of a distributed GM. Thus, data stored in any GM segment 220a-n may be accessed by any director 216a-n on any board 212a-n. Additionally, each of the memory portions 214a-n may respectively include board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, board local segment 222a may be a segment of the memory portion 214a on board 212a configured for board-local use solely by components on the single/same board 212a. For example, board local segment 222a may include data described in following paragraphs which is used and accessed only by directors 216a included on the same board 212a as the board local segment 222a. In at least one embodiment in accordance with techniques herein and as described elsewhere herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 3:
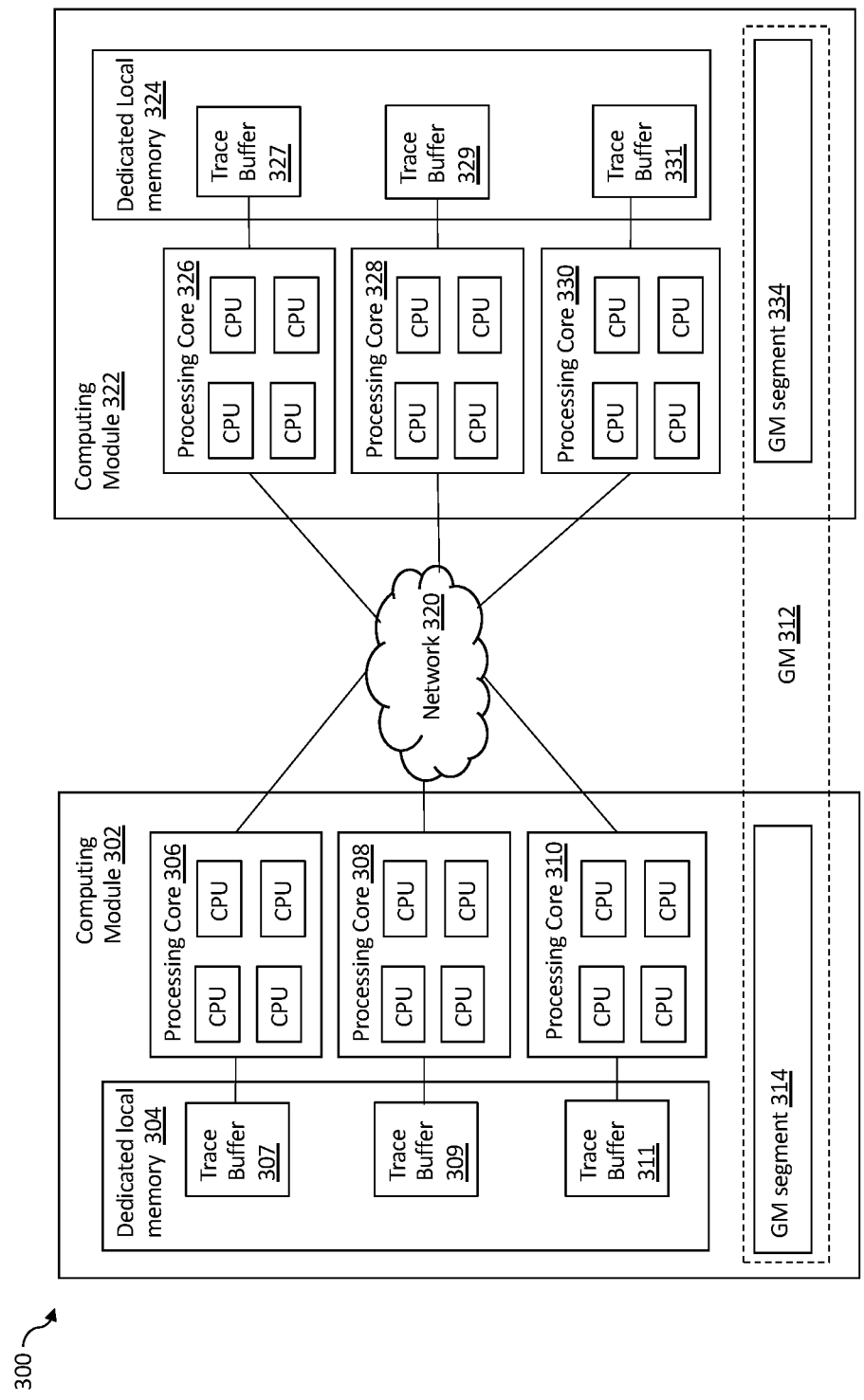
FIG. 3 is a block diagram illustrating an example of a storage system including multiple computing modules and processing cores, according to embodiments of the invention.

FIG. 3 is a block diagram illustrating an example of a storage system 300 including multiple computing modules and processing cores, according to embodiments of the invention. Other embodiments of a storage system including multiple computing modules and processing cores, for example, variations of the storage system 300, are possible and are intended to fall within the scope of the invention. The storage system 300 may be a variation of the storage system 211 and may include any of the functionality and/or component described above in relation to storage systems 211 and/or 20a.

The storage system 300 may include multiple computing modules, including computing modules 302 and 322. It should be appreciated that the storage system may include more than two computing modules. Each of computing modules 302 and 322 may be a director board of a Power-Max system made available from Dell EMC. Computing module 302 may include a plurality of processing cores, including processing cores 326, 328 and 330. Each processing core may include a plurality of CPUs, including a number other than four as illustrated in FIG. 3. Each of the processing cores 326, 328 and 330 cores may be configured (e.g., hardwired, hardcoded or programmed) as a functional component of a storage system, for example, an FA, BE or DS. It should be appreciated that the computing module 302 may include more than three processing cores.

The computing module 302 also may include a dedicated local memory 304 dedicated to the computing module, which may be an implementation of the board local segment 222a described in relation to storage system 211. Each of the processing cores 306, 308 and 310 may be allocated a portion of the dedicated local memory in which to implement a trace buffer, for example, trace buffers 307, 309 and 311, respectively. Each of the trace buffers 307, 309 and 311 may be implemented as described in more detail elsewhere herein. The computing module 302 may include a GM segment 314, which may be an implementation of the board local GM segment 222a described in relation to the storage system 211. The GM segment 314 may be a shared portion of a distributed GM 312. Distributed GM 312 may include a GM segment 334 of a computing module 322. The computing module 322 may be connected to the computing module 302 by an internal fabric 320, and may include any of: processing cores 326, 328 and 330, dedicated local memory 324 including trace buffers 327, 329 and 331 and GM segment 334, each of which may have the same or similar features as the features described for components of the same name of the computing module 302.

The storage system 300 may be used to implement one or more embodiments of the invention, including a method of collecting and analyzing trace information, for example, a method 400 which will now be described in relation to FIG. 4.

Figure 4:
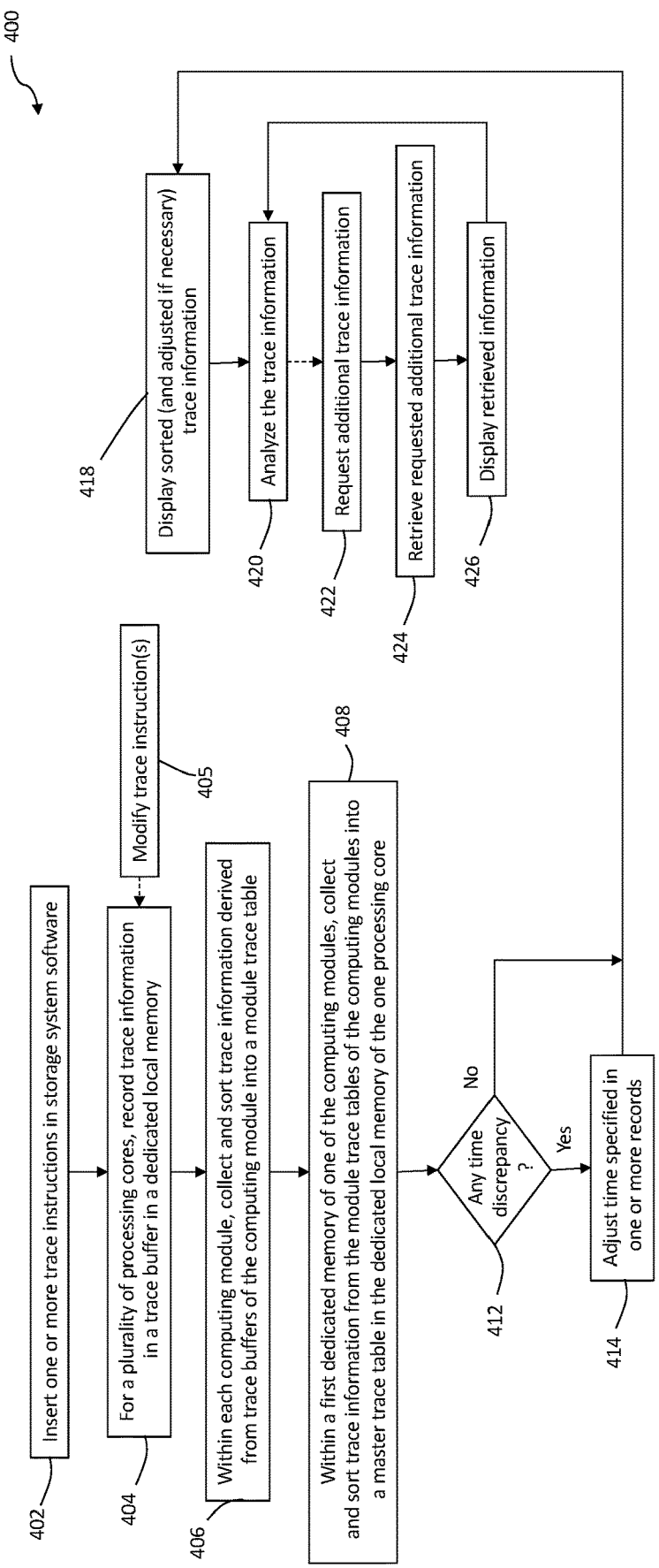
FIG. 4 is a flow chart illustrating an example of a method of collecting and analyzing trace information for I/O operations executing on a multi-computing module storage system, according to embodiments of the invention.

FIG. 4 is a flow chart illustrating the method 400 of collecting and analyzing trace information for I/O operations executing on a multi-computing module storage system, according to embodiments of the invention. Other embodiments of a method of collecting and analyzing trace information for I/O operations executing on a multi-computing module storage system, for example, variations of the method 400, are possible and are intended to fall within the scope of the invention.

In a step 402, one or more trace instructions may be inserted into software that executes on a storage system. For example, a software engineer may program source code of the storage system to include one or more trace instructions, for example, at locations within the code at which I/O operations are being executed. Execution of each instructions may cause information about the state of one or more variables, which may be selected by the programmer, and may be referred to herein as trace information, to be recorded as is described in more detail herein. The recorded trace information may include any of a variety of I/O-related information, including any of the I/O-related information described herein.

In a step 404, for a plurality of processing cores, trace information may be recorded in a trace buffer in a dedicated local memory for a processing core, for example, in any of trace buffers 500, 520 and 540 describe in relation to FIG. 5.

FIG. 5 is a block diagram illustrating examples of trace buffers 500, 520 and 540, according to embodiments of the invention. Other examples of trace buffers, for example, variations of trace buffers 500, 520 or 540 are possible and are intended to fall within the scope of the invention. The examples illustrated in FIG. 5 may reflect recording entries in multiple trace buffers of different computing modules for an I/O operation, for example, a read operation, according to embodiments of the invention.

A trace buffer 500 may include a plurality of records (i.e., entries) 502a-e, where each record corresponds to a sub-operation for which a trace instruction was executed by a particular process core of computing engine. Each record 502*a-e* may specify a value for each of time column 504, trace ID column 506, sub-operation description column 508, action column 512, computing module ID column 514, core ID column 516 and one or more other information columns 518. A value of a timestamp generated on the computing module for the time of execution of the sub-operation corresponding to a record may be specified in the time column 504. A unique identifier of the instance of the executed sub-operation corresponding to the record may be specified in the trace ID column 506. A description of the executed sub-operation corresponding to the record may be specified in the description column 508. The action performed (e.g., the role played) by the processing core in connection with the sub-operation corresponding to the entry may be specified in the action column. For example, a processing core may perform the action of sending a communication to perform the sub-operation, receive a communication to perform the action or may perform the action of executing the sub-operation. An ID of the computing module and an ID of the processing module corresponding to the sub-operation, i.e., the processing module and computing module that populated the record and to which the trace buffer 500 belongs, may be specified in computing module ID column 514 and processing core ID column 517, respectively. Any of a variety of other information related to the sub-operation corresponding to the record, e.g., any such information described herein, may be specified in one or more other information columns 518.

Trace Buffers 520 and 540 may be trace buffers for other processing cores, and may include entries 522*a-c* and 542*a-c*, corresponding to sub-operations executed by the processing cores to which trace buffers 520 and 540, respectively, are allocated, and which respective processing cores populated trace buffers 520 and 540. Each of records 522*a-c* and 542*a-c* may specify values for the same columns 504, 506, 508, 512, 514, 516 and 518 describe above in relation to the trace buffer table 500, but for the sub-operations corresponding to their respective processing cores.

Returning to the method 400, in a step 406, within each computing module, trace information derived from trace buffers of the computing module may be collected and sorted (e.g., according to time) in a module trace table for the computing module. For example, one or more pieces of information may be copied from trace records of one or more trace buffers of the computing module into the module trace table of the computing module, and, for each trace buffer record, a pointer specifying a memory address of the record within the dedicated local memory of the computing module may be recorded in the corresponding record in the module trace table.

For example, FIG. 6 is a block diagram illustrating an example of a computing module trace table 600, according to embodiments of the invention. Other examples of a computing module trace table, for example, variations of the computing module trace table 600 are possible and are intended to fall within the scope of the invention.

The module trace table 600 may correspond to a computing module A, and may be derived from the trace buffer 500, which may correspond to a processing core 1 of the computing module A, and from the trace buffer 520, which may correspond to a processing core 3 of the computing module A. For example, the trace table 600 may include trace records 602*a*-602*d* and 602*h* corresponding to records 502*a-e* of the trace buffer 502, and include trace records 602*e-g* corresponding to records 522*a-c* of the trace buffer 522. The module trace buffer 600 may include columns 604, 606, 608, 612, 614 and 616 corresponding to columns 504, 506, 508, 512, 514 and 516 of trace buffers 502, 522 and 524. However, rather than having one or more other information columns, the module trace buffer may have a pointer column 618 for providing a pointer specifying a memory address of the trace buffer record corresponding to the module trace table record. As illustrated by module table 600, records 602*a*-602*h* may be sorted by the time values specified in the time column 604 of each record.

The module trace table 600 may be configured so that each record includes less or more information than is depicted in FIG. 6. In some embodiments, the module trace table 600 may be configured so that each record includes only: a minimum amount of information to uniquely identify the record from other module trace table entries, and to identify a specific sub-operation; a time of execution of the sub-operation; and a memory location of the corresponding record of the trace buffer.

In some embodiments, the information included in each record of the module trace table 600 may be based on information provided by a user or other entity, which may be used to filter information from trace buffer records of the trace buffers 502 and 522 to populate the module trace table records 622*a-h*.

Returning to the method 400, in a step 408, within a first dedicated memory of one of the computing modules, trace information from the module trace tables of the computing modules may be collected and sorted into a master trace table in the dedicated local memory of the one processing core. The records of the master trace table may be sorted, for example, based on the time value in each record indicating the time at which the represented sub-operation was executed.

The step 408 may include collecting trace information only from select computing modules; i.e., from less than all of the computing modules. For example, a user may select to perform analysis on certain functional components (e.g., FAs, BEs and/or DSs) only. Accordingly, trace information may be collected only from the computing module(s) having processing cores that implement the selected functional components. Similarly, a user may select specific processing cores themselves, and trace information may be collected only from the computing module(s) having the selected processing cores. Thus, the method 400 may include a step (not shown) prior to the step 408 of receiving a user input (e.g., from a GUI or command line interface) to select information from a certain timeframe for specified functional components and/or processing cores only. Only retrieving trace information for select functional components and/or processing cores may reduce (perhaps significantly) an amount of trace information that is exchanged over internal fabric between the computing module of the collecting processing core and the computing modules of other computing modules.

FIG. 7A is a block diagram illustrating an example of a master trace table 700, according to embodiments of the invention. Other examples of a master trace table, for example, variations of the master trace table 700 are possible and are intended to fall within the scope of the invention.

The master trace table 700 may be derived from the module trace buffer 600, and a module trace buffer (not shown) corresponding to a computing module B, which may have been derived from the trace buffer 540 corresponding to a processing core 2 of the computing module. For illustrative purposes, it will be assumed that the processing core 2 is the only processing core of the computing module B that recorded any entries for the time frame for which records were collected. It should be appreciated that in actual practice, trace records in module trace tables may be derived from trace records of several trace buffers corresponding to several processing cores. Further, while each of trace buffers 502, 522 and 542, module trace buffer 600 and master trace buffer show less than twenty records, it should be appreciated that each of these data structures may hold hundreds, thousands, millions or even tens of millions of records. For example, a storage system may execute a million or more I/O operations per second, and each of these I/O operations may include execution of tens of sub-operations, so trace buffers may fill-up fast. In some embodiments, after a trace buffer reaches capacity, the trace buffer may be purged and re-populated anew starting with a next trace instruction. Alternatively, a trace buffer may be a circular buffer in which, once full, oldest records are purged and replaced with records for most recently executed trace instructions.

The master trace table 700 may include columns 704, 706, 708, 712, 714, 716 and 718 corresponding to columns 604, 606, 608, 612, 614, 616 and 618 of the one or more module trace tables 600 from which the records in master trace table 700 are gathered. The master table 700 includes a plurality of records 702*a-k* sorted by the value specified in the time column 704 of each respective column.

Returning to the method 400, in a step 412 it may be determined whether there is any time discrepancy among the records of the master trace table. For example, the master trace table records may be analyzed to determine whether any two records constitute a pair of records for a same sub-operation, e.g., a first record of the pair representing a sending of first sub-operation from a sending processing core of one of the plurality of computing units and a second record of the pair representing a receiving of the first sub-operation at a receiving processing core of the plurality of processing cores. If a pair is determined, it may be determined whether the time specified by the record representing the receiving of the sub-operation is less than the time specified by the record representing the sending of the sub-operation, and if so, by how much time. In other words, are the pair of records indicating a nonsensical sequence in which a sub-operation communications is received at a processing core of a computing module before it is sent from a processing core of another computing module. Such a determination would indicate the clock of each corresponding computing module is skewed, even though a universal clock (e.g., in accordance with a network time protocol (NTP)) may have been employed.

In response to such a determination, a time specified in one or more records may be adjusted in a step 414. For example, any entries in the master record for the computing module (or at least the processing core) of the record representing the sending of the sub-operation, which indicate a time prior to such record (i.e., listed earlier in the master trace table if already sorted—or alternatively any records of such computing module for consistency—may be decremented by at least an amount of the skew. Alternatively in response to this determination, any entries in the master record for the computing module (or at least the processing core) of the record representing the receiving of the sub-operation, which indicate a time after such record (i.e., listed later in the master trace table if already sorted) may be incremented by at least an amount of the skew. However, decrementing the records of the other computing module (or processing core thereof) as described above may be preferred to avoid having to adjust the entries corresponding to the computing module (or processing core thereof) of the receiving record again if additional future records are analyzed with respect to such records.

For example, referring again to the master trace table 700, it may be determined from values in trace ID column 706 that records 702*a* and 702*e* (trace ID=61) are a pair of records for the sub-operation of locking a cache slot for an I/O operation. However, the record 702*a* indicates that a communication to perform the lock was received by the processing core 2 of the computing module B at time 3146, before such communication was sent by processing core 1 of computing module A at 3244 as indicated by the record 702*e*.

As a result, the time discrepancy may be reconciled; for example, the time value for each respective record for the computing module A may be decremented by 100 and the records of the master table 700 re-sorted to produce the modified master table 700' of FIG. 7B. FIG. 7B is a block diagram illustrating a master trace table 700' modified as a result of a determination of a discrepancy between time values of records, according to embodiments of the invention. Other examples of a modified master trace table, for example, variations of the modified master trace table 700' are possible and are intended to fall within the scope of the invention.

As illustrated by modified master trace table 700', time values of records 702*d-h* of the master trace table 700 were decremented by 100 to produce modified records 702*d'*-h' of modified master trace table 700', which as illustrated in FIG. 7B have been resorted along with records 700*a-c* according to the adjusted time values.

Returning to the method 400, in a step 418, the sorted (and adjusted if necessary) entries of the master trace table may be displayed to a user, for example, as part of a GUI. The trace information of the master trace table may be analyzed in a step 420, manually by a human and/or or automatically based on predefined logic, to determine if it is desirable to further investigate any particular one or more sub-operations in greater detail, for example, if the analysis reveals a potential performance issue. If it is so desirable, additional trace information may be requested in a step 422 and retrieved in a step 424. For example, a programmable or user-specifiable amount of information from one or more records of one or more trace buffers on one or more computing modules may be accessed. For example, a timeframe and/or one or more other filters specifying any information recorded in trace buffers may be specified (e.g., by a user using the GUI) and the time values and address pointers in the master trace table records may be used to identify the memory address of, and retrieve and filter information from, the trace buffer records in dedicated local memory of one or more computing modules. The retrieved information may be displayed in a step 426 and analyzed in a next iteration of the step 402. Further iterations of specifying, retrieving, filtering and analyzing trace information may be performed.

As noted elsewhere herein, in the step 402, trace instructions may be programmed into software that runs on the storage system, such trace instructions specifying when (by their logical position in the code) to record trace information and what information to record. In some cases, a user (e.g., storage administrator) may desire to include additional information to be recorded for one or more trace instructions, but does not realize the desire until after the software has already been compiled. In some embodiments, the software may be configured to allow modification (or at least addition) of trace information after compile time. For example, the software may be configured to call out to a predefined file or other software construct to determine what information to record. The software may be further configured to provide a user interface (e.g., GUI or command line interface) the enables a user to modify the information in the software construct; i.e., to modify one or more trace instructions, in a step 405.

It should be appreciated that while steps of the method 400 are illustrated in FIG. 4 as being performed serially, and in a certain order, one or more these steps or portions thereof may be performed concurrently and/or in a different order than illustrated in FIG. 4. For example, trace information may continue to be recorded in the step 404, while information is collected, sorted and aggregated in steps 406 and 408.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 400, or parts thereof, may be implemented using one or more of the systems and/or data structures described in relation to FIGS. 1-3 and 5-7B, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage system comprising a plurality of computing modules, each of the plurality of computing modules including a plurality of central processing units and a local memory dedicated to the computing module, and each of the plurality of computing modules connected to the other of the plurality of computing modules by an internal switching fabric of the storage system, wherein, within each computing module, the plurality of central processing units are grouped into a plurality of processing cores, a method comprising:

executing first code to service an I/O operation on the storage system, wherein said first code includes a plurality of trace instructions, and wherein said executing the first code includes:

for each of two or more of the plurality of computing modules, performing one or more sub-operations of the I/O operation by one or more of the plurality of cores of said each computing module, wherein the one or more sub-operations include a first sub-operation; and executing the plurality of trace instructions and recording trace information in the respective local memory of each of the two or more computing modules for the one or more sub-operations including the first sub-operation of the I/O operation performed by the one or more of the plurality of cores of said each computing module;

a first of the plurality of processing cores on a first of the plurality of computing modules accessing first information corresponding to the recorded trace information in the respective local memory of at least a first of the two or more computing modules;

the first processing core determining a resulting form of the first information, wherein the resulting form facilitates analysis of the first information to determine functional and/or performance characteristics corresponding to the I/O operation, wherein said determining the resulting form includes:

determining, using the first processing core, a pair of recorded entries of the first information denoting the first sub-operation of the I/O operation, wherein a first entry of the pair denotes sending the first sub-operation from a sending processor core of a sending one of the plurality of computing modules at a first time, wherein a second entry of the pair denotes receiving the first sub-operation at a receiving processor core of a receiving one of the plurality of computing modules at a second time, wherein the first sub-operation includes locking, for the I/O operation, a cache slot of a cache included in the storage system, and wherein the sending processor core of the sending one of the computing modules is requesting that the receiving processor core of the receiving one of the computing modules lock the cache slot for the I/O operation;

determining, using the first processing core, a time discrepancy wherein the second time of the second entry, denoting a receiving time, is less than the first time of the first entry, denoting a sending time, by a first amount; and responsive to determining the time discrepancy, reconciling the time discrepancy using the first processing core, wherein said reconciling includes modifying, using the first processing core, a respective time of at least one of the first entry and the second entry based on the first amount;

analyzing, using at least one of the plurality of central processing units of at least one of the plurality of computing modules, the resulting form of the first information;

determining, in response to said analyzing and using at least one of the plurality of central processing units of at least one of the plurality of computing modules, a performance issue; and responsive to determining the performance issue, performing first processing using at least one of the plurality of central processing units of at least one of the plurality of computing modules, wherein said first processing includes requesting and retrieving additional recorded trace information from the respective memory of at least the first of the two or more computing modules.

2. The method of claim 1, wherein the recording of the trace information includes recording the trace information in at least a first data structure including a plurality of entries, each entry representing a respective I/O sub-operation and specifying a time at which the respective I/O operation was performed according to clock utilized by the respective core that recorded the entry, wherein the accessed first information is accessed, for each of the at least first computing module, from a second data structure of the at least first computing module derived from the at least first data structure, the second data structure including a plurality of entries, each entry in the second data structure corresponding to a respective entry in the at least first data structure and specifying the time specified in the corresponding entry in the at least first data structure, and wherein said determining the resulting form of the first information includes sorting the first information according to the times specified in the entries of the second data structure.

3. The method of claim 2, wherein, for each of the at least first computing module, each of the plurality of entries in the second data structure includes a pointer to a memory address of the corresponding entry in the at least first data structure, and includes less information than an amount of information recorded in the corresponding entry.

4. The method of claim 3, wherein said requesting and said retrieving the additional recorded trace information of the first processing further comprises:

receiving a request for more information associated with the one or more sub-operations than specified by the first information; and determining the more information by accessing one or more of the respective memory addresses pointed-to by one or more of the plurality of entries of the second data structure.

5. The method of claim 2, wherein the first information is stored in a third data structure in the local memory of the first computing module, the third data structure derived at least in part from a respective second data structure of the at least second computing module, and the third data structure including a plurality of entries, each entry corresponding to a respective entry of the respective second data structure and including the specified time and the pointer to the memory address included in the respective entry.

6. The method of claim 5, wherein the pair of recorded entries of the first information are included in the third data structure.

7. The method of claim 1, wherein each execution of one of the plurality of trace instructions results in a recording of a piece of the recorded information, wherein software is compiled as part of processing that generates the first code, and the method further comprising:

after compilation of the software used to generate the first code, modifying what pieces of information are recorded.

8. The method of claim 1, wherein said first processing further includes:

prior to performing said requesting and said retrieving, receiving first filter information including a timeframe, wherein the additional recorded trace information is determined by said requesting and said retrieving in accordance with the first filter information.

9. The method of claim 1, wherein said executing the first code further comprises:

sending, from the sending processor core of the sending one of the plurality of computing modules, a communication regarding the first sub-operation of the I/O operation to the receiving processor core of the receiving one of the plurality of computing modules;

receiving, by the receiving processor core of the receiving one of the plurality of computing modules, the communication regarding the first sub-operation of the I/O operation;

responsive to said sending, executing a first trace instruction of the plurality of trace instructions resulting in recording first trace information corresponding to the first trace instruction in a first local memory of the sending one of the plurality of computing modules; and responsive to said receiving, executing a second trace instruction of the plurality of trace instructions resulting in recording second trace information corresponding to the second trace instruction in a second local memory of the receiving one of the plurality of computing modules.

10. A storage system comprising:

an internal switching fabric;

a plurality of computing modules, each of the plurality of computing modules including a plurality of central processing units and a local memory dedicated to the computing module, and each of the plurality of computing modules connected to the other of the plurality of computing modules by the internal switching fabric of the storage system, wherein, within each computing module, the plurality of central processing units grouped into a plurality of processing cores; and memory comprising code stored thereon that, when executed, performs a method including:

executing first code to service an I/O operation on the storage system, wherein said first code includes a plurality of trace instructions, and wherein said executing the first code includes:

for each of two or more of the plurality of computing modules, performing one or more sub-operations of the I/O operation by one or more of the plurality of cores of said each computing module, wherein the one or more sub-operations include a first sub-operation; and executing the plurality of trace instructions and recording trace information in the respective local memory of each of the two or more computing modules for the one or more sub-operations including the first sub-operation of the I/O operation performed by the one or more of the plurality of cores of said each computing module;

a first of the plurality of processing cores on a first of the plurality of computing modules accessing first information corresponding to the recorded trace information in the respective local memory of at least a first of the two or more computing modules;

the first processing core determining a resulting form of the first information wherein the resulting form facilitates analysis of the first information to determine functional and/or performance characteristics corresponding to the I/O operation, wherein said determining the resulting form includes:

determining, using the first processing core, a pair of recorded entries of the first information denoting the first sub-operation of the I/O operation, wherein a first entry of the pair denotes sending the first sub-operation from a sending processor core of a sending one of the plurality of computing modules at a first time, wherein a second entry of the pair denotes receiving the first sub-operation at a receiving processor core of a receiving one of the plurality of computing modules at a second time, wherein the first sub-operation includes locking, for the I/O operation, a cache slot of a cache included in the storage system, and wherein the sending processor core of the sending one of the computing modules is requesting that the receiving processor core of the receiving one of the computing modules lock the cache slot for the I/O operation;

determining, using the first processing core, a time discrepancy wherein the second time of the second entry, denoting a receiving time, is less than the first time of the first entry, denoting a sending time, by a first amount; and responsive to determining the time discrepancy, reconciling the time discrepancy using the first processing core, wherein said reconciling includes modifying, using the first processing core, a respective time of at least one of the first entry and the second entry based on the first amount;

analyzing, using at least one of the plurality of central processing units of at least one of the plurality of computing modules, the resulting form of the first information;

determining, in response to said analyzing and using at least one of the plurality of central processing units of at least one of the plurality of computing modules, a performance issue; and responsive to determining the performance issue, performing first processing using at least one of the plurality of central processing units of at least one of the plurality of computing modules, wherein said first processing includes requesting and retrieving additional recorded trace information from the respective memory of at least the first of the two or more computing modules.

11. The storage system of claim 10, wherein the recording of the trace information includes recording the trace information in at least a first data structure including a plurality of entries, each entry representing a respective I/O sub-operation and specifying a time at which the respective I/O operation was performed according to clock utilized by the respective core that recorded the entry, wherein the accessed first information is accessed, for each of the at least first computing module, from a second data structure of the at least first computing module derived from the at least first data structure, the second data structure including a plurality of entries, each entry in the second data structure corresponding to a respective entry in the at least first data structure and specifying the time specified in the corresponding entry in the at least first data structure, and wherein said determining the resulting form of the first information includes sorting the first information according to the times specified in the entries of the second data structure.

12. The storage system of claim 11, wherein, for each of the at least first computing module, each of the plurality of entries in the second data structure includes a pointer to a memory address of the corresponding entry in the at least first data structure, and includes less information than an amount of information recorded in the corresponding entry.

13. The storage system of claim 12, wherein said requesting and said retrieving the additional recorded trace information of the first processing further comprises:

receiving a request for more information associated with the one or more sub-operations than specified by the first information; and determining the more information by accessing one or more of the respective memory addresses pointed-to by one or more of the plurality of entries of the second data structure.

14. The storage system of claim 11, wherein the first information is stored in a third data structure in the local memory of the first computing module, the third data structure derived at least in part from a respective second data structure of the at least second computing module, and the third data structure including a plurality of entries, each entry corresponding to a respective entry of the respective second data structure and including the specified time and the pointer to the memory address included in the respective entry.

15. The storage system of claim 14, wherein the pair of recorded entries of the first information are included in the third data structure.

16. The storage system of claim 10, wherein each execution of one of the plurality of trace instructions results in a recording of a piece of the recorded information, wherein software is compiled as part of processing that generates the first code, and the method further comprising:

after compilation of the software used to generate the first code, modifying what pieces of information are recorded.

17. For a storage system comprising a plurality of computing modules, each of the plurality of computing modules including a plurality of central processing units and a local memory dedicated to the computing module, and each of the plurality of computing modules connected to the other of the plurality of computing modules by an internal switching fabric of the storage system, wherein, within each computing module, the plurality of central processing units are grouped into a plurality of processing cores, one or more non-transitory computer-readable media comprising:

first executable code that services an I/O operation on the storage system, wherein said first executable code includes a plurality of trace instructions, wherein said first executable code further includes:

executable code that, for each of two or more of the plurality of computing modules, performs one or more sub-operations of the I/O operation by one or more of the plurality of cores of said each computing module, wherein the one or more sub-operations include a first sub-operation; and executable code that executes the plurality of trace instructions and controls recording trace information in the respective local memory of each of the two or more computing modules for the one or more sub-operations including the first sub-operation of the I/O operation performed by the one or more of the plurality of cores of said each computing module;

executable code that controls a first of the plurality of processing cores on a first of the plurality of computing modules accessing first information corresponding to the recorded trace information in the respective local memory of at least a first of the two or more computing modules;

executable code that controls the first processing core determining a resulting form of the first information, wherein the resulting form facilitates analysis of the first information to determine functional and/or performance characteristics corresponding to the I/O operation, wherein said executable code that controls the first processing core determining the resulting form of the first information includes:

executable code that determines a pair of recorded entries of the first information denoting the first sub-operation of the I/O operation, wherein a first entry of the pair denotes sending the first sub-operation from a sending processor core of a sending one of the plurality of computing modules at a first time, wherein a second entry of the pair denotes receiving the first sub-operation at a receiving processor core of a receiving one of the plurality of computing modules at a second time, wherein the first sub-operation includes locking, for the I/O operation, a cache slot of a cache included in the storage system, and wherein the sending processor core of the sending one of the computing modules is requesting that the receiving processor core of the receiving one of the computing modules lock the cache slot for the I/O operation;

executable code that determines a time discrepancy wherein the second time of the second entry, denoting a receiving time, is less than the first time of the first entry, denoting a sending time, by a first amount; and executable code that, responsive to determining the time discrepancy, reconciles the time discrepancy, wherein reconciling the time discrepancy includes modifying a respective time of at least one of the first entry and the second entry based on the first amount;

executable code that analyzing, using at least one of the plurality of central processing units of at least one of the plurality of computing modules, the resulting form of the first information;

executable code that determines, in response to said analyzing the resulting form and using at least one of the plurality of central processing units of at least one of the plurality of computing modules, a performance issue; and executable code that, responsive to determining the performance issue, performs first processing using at least one of the plurality of central processing units of at least one of the plurality of computing modules, wherein said first processing includes requesting and retrieving additional recorded trace information from the respective memory of at least the first of the two or more computing modules.

18. The one or more non-transitory computer-readable media of claim 17, wherein the recording of the trace information includes recording the trace information in at least a first data structure including a plurality of entries, each entry representing a respective I/O sub-operation and specifying a time at which the respective I/O operation was performed according to clock utilized by the respective core that recorded the entry, wherein the accessed first information is accessed, for each of the at least first computing module, from a second data structure of the at least first computing module derived from the at least first data structure, the second data structure including a plurality of entries, each entry in the second data structure corresponding to a respective entry in the at least first data structure and specifying the time specified in the corresponding entry in the at least first data structure, and wherein said determining the resulting form of the first information includes sorting the first information according to the times specified in the entries of the second data structure.

19. The one or more non-transitory computer-readable media of claim 18, wherein, for each of the at least first computing module, each of the plurality of entries in the second data structure includes a pointer to a memory address of the corresponding entry in the at least first data structure, and includes less information than an amount of information recorded in the corresponding entry.

20. The one or more non-transitory computer-readable media of claim 19, wherein the one or more non-transitory computer-readable media further comprises:

executable code that receives a request for more information associated with the one or more sub-operations than specified by the first information; and executable code that determines the more information by accessing one or more of the respective memory addresses pointed-to by one or more of the plurality of entries of the second data structure.

21. The one or more non-transitory computer-readable media of claim 18, wherein the first information is stored in a third data structure in the local memory of the first computing module, the third data structure derived at least in part from a respective second data structure of the at least second computing module, and the third data structure including a plurality of entries, each entry corresponding to a respective entry of the respective second data structure and including the specified time and the pointer to the memory address included in the respective entry.

22. The one or more non-transitory computer-readable media of claim 21, wherein the pair of recorded entries of the first information are included in the third data structure.

\* \* \* \* \*